C. P. STEINMETZ.
PROTECTIVE DEVICE.
APPLICATION FILED SEPT. 17, 1917.
1,270,894.
Patented July 2, 1918.
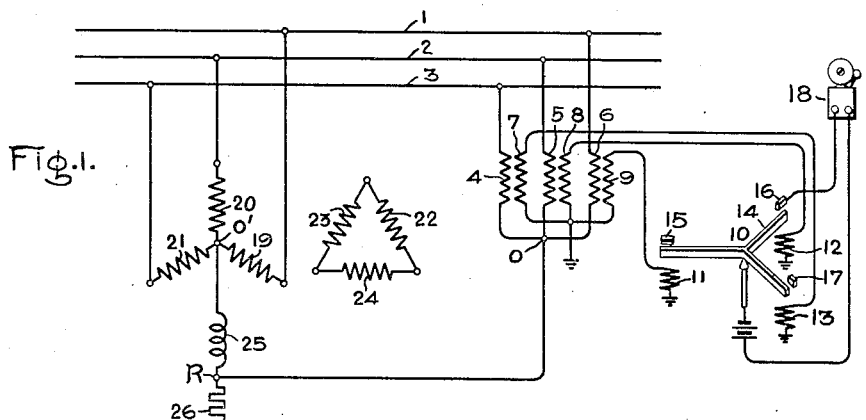
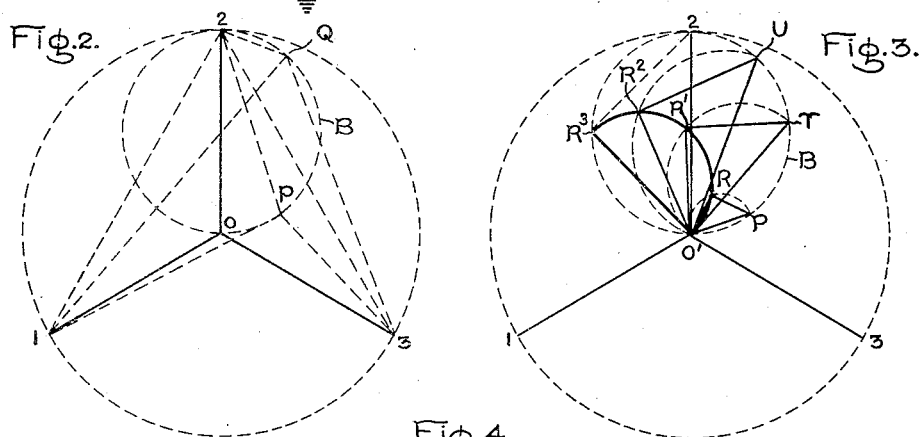
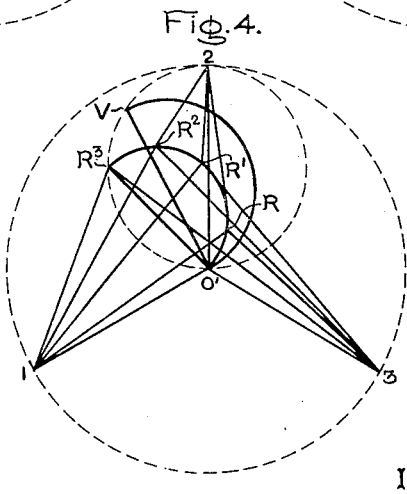
Inventor:
Charles P. Steinmetz
by *Albert G. Davis*
His Attorney.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

PROTECTIVE DEVICE.

1,270,894. Specification of Letters Patent. Patented July 2, 1918.

Application filed September 17, 1917. Serial No. 191,728.

*To all whom it may concern:*

Be it known that I, CHARLES P. STEINMETZ, a citizen of the United States, residing at Schenectady, county of Schenectady, State of New York, have invented certain new and useful Improvements in Protective Devices, of which the following is a specification.

My invention relates to protective devices and has for its object to provide a protective device which is operative to select the phase of an electrical system of distribution upon which there is fault to ground of a high resistance character before such fault develops into one of low resistance or a ground of arcing character.

Devices are known in the art which are operative on faults to ground of arcing character which are of comparatively low resistance, to select the phase of a system of distribution upon which the fault occurs, such a device being disclosed in Patent No. 1,230,680 issued to E. E. F. Creighton. This phase selective device is of the differential type and operates in response to the voltage unbalancing between the phases and ground caused by a fault to ground, to select or indicate that phase of the system upon which there is the greatest drop of potential.

On such systems of distribution, it is highly desirable to protect them from the effects of arcing grounds, by selecting the phase of the system upon which such faults occur in the initial stages of their existence and before they develop into grounds of arcing or detrimental character. Such faults to ground often start by the slow burning of a wooden cross arm or by other similar agencies permitting a leakage to ground over a path which is of high resistance. Such high resistance faults to ground do not lower the potential of the phase at fault to any great extent and the phase upon which the greatest drop in potential occurs is not the phase at fault but the adjacent lagging phase or the next phase of rotation in respect to time, that is, if the high resistance ground occurs in phase 2, then phase 3 has the greatest drop in potential. Under these circumstances, when the usual type of phase selective device is made sensitive enough to selectively operate on the slight drop in potential caused by high resistance grounds, the wrong phase is indicated as in trouble.

By the protective device embodying the novel features of my invention, I overcome this disadvantage and provide a means for accurately selecting and indicating the phase in trouble under not only conditions of high resistance grounds or faults to ground in the earliest stages of their development but also under conditions of fault to ground of low resistance. Under conditions of high resistance grounds the trouble can be located and repaired before such faults develop into those of detrimental character.

The novel features which I believe to be characteristic of my invention will be indicated in the claims appended hereto while the features of construction and mode of operation will be understood by reference to the following description taken in connection with the accompanying drawings which show the preferred embodiments of my invention, in which;

Figure 1 shows diagrammatically the connections for my protective device whereby the device will accurately select the phase upon which a high resistance fault to ground occurs, and Figs. 2, 3 and 4 are vector diagrams of the voltage relations on a three phase system of distribution under varying conditions of a fault to ground on one phase.

In Fig. 1 is shown a portion of a system of distribution comprising conductors 1, 2 and 3 to which are respectively connected in Y relation, the primaries 4, 5 and 6 of a potential transformer. In the usual operation of phase selective devices, the neutral point O of primaries 4, 5 and 6 is grounded. To the secondaries 7, 8 and 9 connected in Y relation, I have shown phase selective device 10 comprising electroresponsive means or devices 11, 12 and 13 corresponding to each phase, excited from Y-connected secondaries 7, 8 and 9, respectively. As was stated, with the primaries 4, 5 and 6 connected to ground, each electroresponsive means 11, 12 and 13 is responsive to the voltage between its particular phase and ground. The electroresponsive means control a differentially operated circuit controlling member or armature 14 which is of the three armed type, each arm adapted to engage a coöperating contact 15, 16 or 17 to control independent indicating or trip circuits. The forces exerted by the electroresponsive means 11, 12 and 13 on the armature 14 are balanced, under normal conditions on the system, but when a fault to ground occurs on any phase of an arcing or low resistance character, the drop in voltage between the faulty phase and ground causes the electroresponsive means corresponding to the phase at fault to exert the weakest force. An unbalancing occurs which causes the armature 14 of the phase selective device to move differentially and close a trip circuit for a switch or a circuit including an indicating or recording device to select that phase having the greatest drop in potential. I have shown, connected to one of said contacts, 16, for instance, such an indicating circuit including, for instance, a bell 18 or other suitable indicating means. It is understood that similar indicating devices are also connected in series with the other contacts 15 and 17. On faults to ground of high resistance, as has been before stated, the phase at fault does not have the greatest drop in potential, therefore, a phase selective device operating on the potential changes between each phase and ground does not operate to correctly indicate the phase in trouble, and cannot, therefore, be used to detect such faults to ground in the initial stages of their development. With a high resistance ground on phase 2, for instance, phase 3 has the greatest drop in potential and hence the electroresponsive means corresponding to this phase exerts the weakest force causing the armature 14 to close the indicating circuit of phase 3, thus erroneously indicating phase 3 as faulty. This condition can be best understood from the vectorial relations of the voltages to ground from each phase under varying resistance of faults to ground as shown in Fig. 2.

In Fig. 2, assume, as is the usual practice, that the neutral point O of primaries 4, 5 and 6 is connected to ground, then the Y voltages from the phases or conductors 1, 2 and 3 to ground or to the neutral point O of primaries 4, 5 and 6 which is at ground potential, is shown by 1—O, 2—O and 3—O, respectively. Assume a high resistance fault to ground develops on one phase, phase 2, for instance, caused by the slow burning of a wooden cross arm or the like. As the condition of such a fault to ground develops, the resistance of the fault diminishes until finally an arc-over occurs and a path of comparatively low resistance to ground is formed. Under these conditions of a fault to ground on phase 2, varying from high resistance to low resistance, the neutral of the system O or the point of ground potential continually shifts, the locus of the point O being a semi-circle B on 2—O as a diameter. When the fault to ground on phase 2 is of a certain high resistance, the neutral point O shifts along semi-circle B to a point, such as P. The voltage to ground from phases 1, 2 and 3 is then represnted by 1—P, 2—P and 3—P, respectively. It will be observed that, under this condition of high resistance ground, conductor or phase 3 has the greatest drop in potential so that the usual phase selective relay would operate to indicate phase 3 at fault instead of phase 2. It is only when the resistance of the fault to ground decreases corresponding to a shifting of ground potential or the point O to the point Q, for instance, that is, the fault to ground is of sufficiently low resistance to arc to ground, that the usual phase selective relay operates to correctly indicate the phase at fault as the voltages from each phase to ground are 1—Q, 2—Q, and 3—Q, and phase 2, the phase at fault, has the greatest drop in potential. It is thus apparent that a phase selective device operative on the relative changes in potential between the phases of the system and ground or point O is unsatisfactory to select a phase upon which a fault to ground of high resistance takes place.

According to my invention, I provide a separate means for establishing a neutral point for the system and for holding it fixed as the true neutral of the system. For this purpose, I connect the primaries 19, 20 and 21 of a second potential transformer in Y relation to the conductors 1, 2 and 3, respectively, and connect the neutral point O', thereof, to ground. The secondaries 22, 23 and 24 of this transformer I connect in closed delta in order to hold the neutral point O' of the system fixed and to prevent it from shifting thereby establishing a neutral point which is always the true neutral of the system. I then provide means for establishing what I prefer to call a fictitious neutral point for the system and which I prefer to show theoretically as a reactance element 25, which may be either an element possessing inductance or capacity, and a resistance element 26 connected in series in the connection between the true or fixed neutral point O' and ground. I establish thereby, between the reactance and the resistance elements, a point R which is the fictitious neutral of the system. The ohmic resistance of elements 25 and 26 may have any relation but for the most satisfactory results, I prefer to so arrange these two elements that their ohmic resistances are substantially equal. I then connect the neutral point O of the primaries 4, 5, and 6 to the fictitious neutral point R so that the electroresponsive devices of my phase selective relay are responsive to the potential between their respective phases and the fictitious neutral point R or to the potential across the reactance element 25.

The voltage relations upon which my phase selective relay is responsive, is best shown in Fig. 3 in which, as in Fig. 2, 1—O', 2—O', 3—O' represent the voltages between phases 1, 2 and 3 respectively, and ground. Assume as before that a fault to ground of high resistance occurs on phase 2, so that the point of ground potential shifts along the semi-circle B to the point P. Now O'—P is the voltage between true neutral O', which is fixed, and ground and from Fig. 1 it is observed that this voltage is composed of two components, the drop through the reactance element 25 or the drop from true neutral O' to the fictitious neutral R and the drop through the resistance element 26 or the drop from the fictitious neutral R to ground. These two components will be, due to the nature of the elements 25 and 26, 90° apart. As I prefer to arrange the elements 25 and 26 so that their ohmic resistances are substantially equal, then the voltage drops across the reactance element 25 and resistance 26 are substantially equal. We have, therefore, as shown in Fig. 2 the voltage drop O'—P from true neutral to ground made up of two equal components at right angles to each other, namely, O'—R and R—P where O'—R is the voltage drop from the true neutral O' to the fictitious neutral R and R—P is the drop from the fictitious neutral to ground. According to the relation of the ohmic resistances of the two elements 25 and 26 the point R will shift along a semi-circle drawn on O'—P as a diameter.

Assume that a fault to ground occurs on phase 2 having a decreased resistance or a value such that ground potential shifts along the semi-circle B to the point T. Then as before we have the voltage drop from the true neutral O' to ground as O'—T and as has been described this voltage drop comprises two equal components at right angles O'—P' and P'—T, the drop from true neutral to the fictitious neutral and the drop from fictitious neutral to ground, respectively. With a fault to ground of still lower resistance causing ground potential to shift to the point U on the semi-circle B then as before the voltage drop O'—U is composed of component O'—R² and R²—U and when finally a condition of dead ground exists on phase 2, O'—2 is the voltage of true neutral to ground which is made up of components O'—R³ and R³—2. It is thus apparent that with the ohmic resistance of the elements 25 and 26 substantially equal and with a fault to ground on phase 2 varying from a high resistance to a low resistance and finally to a dead ground, that the locus of the fictitious neutral R is a semi-circle on the line O'—R³ as a diameter. As best shown in Fig. 4, by adopting another relation between the ohmic resistances of the elements 25 and 26, the locus of the fictitious neutral R may be, for instance, a semi-circle on the line O'—V as a diameter. In Fig. 4 the voltages between each phase and the fictitious neutral R for a high resistance condition of ground on phase 2 causing the fictitious neutral to shift to the point R, will be 1—R, 2—R and 3—R, respectively. The greatest drop in voltage occurs thereby on the faulty phase, 2, and for all values of resistance of a fault to ground as the fictitious neutral shifts to points R¹, R², and R³ the voltage drop between the faulty phase 2 and the fictitious neutral is always greater than the corresponding drop on the other two phases.

I, therefore, utilize the drop in potential between each phase and the fictitious neutral R to operate my phase selective relay and by utilizing these voltage relations, I am able to obtain the greatest drop in potential on the phase at fault irrespective of the resistance of the fault to ground so that the device of my invention will accurately select the phase upon which not only a high resistance fault to ground occurs but also a fault to ground of any resistance.

What I claim as new and desire to secure by Letters Patent of the United States, is:—

1. In a polyphase system of distribution, means for establishing a fixed neutral therefor, a connection to ground from said neutral, means for establishing a point in said ground connection between which and any phase of said system upon which a fault to ground occurs a greater drop in potential always occurs on the phase at fault than on the other phases independent of the resistance of the fault to ground, and electroresponsive means operative in response to the voltage between each phase and said point to selectively indicate the phase having the greatest drop in potential.

2. In a polyphase system of distribution, means for establishing a fixed neutral point therefor, means responsive to the occurrence of a fault to ground on any phase of said system for establishing a fictitious neutral point for said system from which to the phase at fault the voltage drop is always greater than the corresponding voltage drop on the other phases, and electrical means responsive to the voltages from each phase to said fictitious neutral for indicating the phase having the greatest voltage drop.

3. In a polyphase system of distribution having a fixed neutral point, a connection to ground from said neutral point, means responsive to a fault to ground on any phase for dividing the drop in voltage from said neutral point to ground into a reactance and a resistance component; a fictitious neutral point for said system determined by said components, and electrorepsonsive means operative in response to the drop in voltage between each phase of the system and said fictitious neutral to selectively indicate that phase having the greatest drop in potential.

4. In a polyphase system of distribution having a fixed neutral point, means for establishing a fictitious neutral point for said system between which and any phase of said system the drop in voltage caused by a fault to ground is always greatest on the phase at fault irrespective of the resistance of said fault to ground, and a phase selective device operative to selectively indicate the phase upon which the greatest drop in potential occurs.

5. In combination with a polyphase system of distribution, means responsive to voltage unbalancing on said system caused by a fault to ground to selectively indicate the phase having the greatest drop in potential, and means for causing the greatest drop in potential to occur on the phase at fault independent of the resistance of the fault to ground.

6. In combination with a polyphase system of distribution, means for establishing a fixed neutral point for said system, means connected to said system for establishing a fictitious neutral point therefor, and a device differentially operative in response to the voltage relations between each phase of said system and said fictitious neutral upon the occurrence of a fault to ground to selectively indicate the phase having the greatest drop in voltage.

7. In combination with a polyphase system of distribution, means differentially operative in response to voltage unbalancing on said system caused by the occurrence of a fault to ground, to selectively indicate the phase having the greatest drop in voltage, and electrical connections for said system for rendering said means responsive to a voltage relation in which the phase at fault always has the greatest drop in potential irrespective of the resistance of the fault to ground.

8. In combination with a polyphase system of distribution having a fixed neutral point, electrical connections for producing a fictitious neutral point for said system such that a fault to ground on any phase causes a greater drop in potential between that phase and said fictitious neutral than occurs on any other phase independent of the resistance of the fault to ground, and a phase selective device operative in response to the voltage relations between each phase and said fictitious neutral point to selectively indicate that phase which has the greatest drop in potential.

9. The combination with a polyphase system of distribution, means for establishing a fixed neutral point for said system, a connection to ground from said neutral point including resistance and reactance elements of substantially the same ohmic resistance, a fictitious neutral point established by said elements, and electroresponsive means responsive to the voltage drop between each phase and said fictitious neutral caused by a fault to ground in any phase to selectively indicate the phase at fault independent of the resistance of the fault to ground.

10. In a polyphase system of distribution, a fixed neutral point therefor, a reactance element connected to said neutral point, a resistance element between said reactance element and ground, and electroresponsive means operative in response to the voltage drop from each phase across said reactance caused by a fault to ground on any phase to selectively indicate the phase at fault irrespective of the resistance of said fault to ground.

11. In a polyphase system of distribution, means for establishing a true neutral point for said system, a connection from said neutral point to ground, means for resolving the drop in potential from said true neutral to ground caused by a fault to ground on any phase into a resistance drop and a reactance drop, and electroresponsive means operative in response to the reactance drop to select the phase at fault.

12. In combination with a system of distribution having a fixed neutral, means for establishing a fictitious neutral, for said system and electroresponsive means differentially operative in response to the voltage between each phase of said system and said fictitious neutral.

13. A device for selectively indicating the phase of a polyphase system of distribution upon which a fault to ground occurs comprising electroresponsive devices corresponding to each phase of said system, a differentially operative circuit controlling member held in balanced condition when the forces exerted by said devices are substantially equal, means corresponding to each phase selectively operative by said circuit controlling member in response to unequal forces exerted by said electroresponsive devices to indicate the phase at fault corresponding to that device exerting the weakest action and means for rendering said electroresponsive devices responsive to conditions on said system such that irrespective of the resistance of the fault to ground on any phase the weakest action is always exerted by that electroresponsive device corresponding to the phase at fault.

14. A device for selectively indicating the phase at fault on a polyphase system of distribution upon the occurrence of a high resistance ground on any phase, comprising voltage responsive devices corresponding to each phase, means differentially controlled by said devices which in response to a fault to ground indicates the phase having the greatest drop in potential, and means for rendering said devices responsive to such voltages that the greatest drop in voltage always occurs on the phase at fault irrespective of the resistance of said fault to ground.

In witness whereof, I have hereunto set my hand this 15th day of September, 1917.

CHARLES P. STEINMETZ.